April 11, 1933. J. NUMAN SCHRÖDER 1,903,572
MACHINE FOR WORKING, MOLDING, AND SHAPING DOUGH
Filed Nov. 10, 1930 3 Sheets-Sheet 1
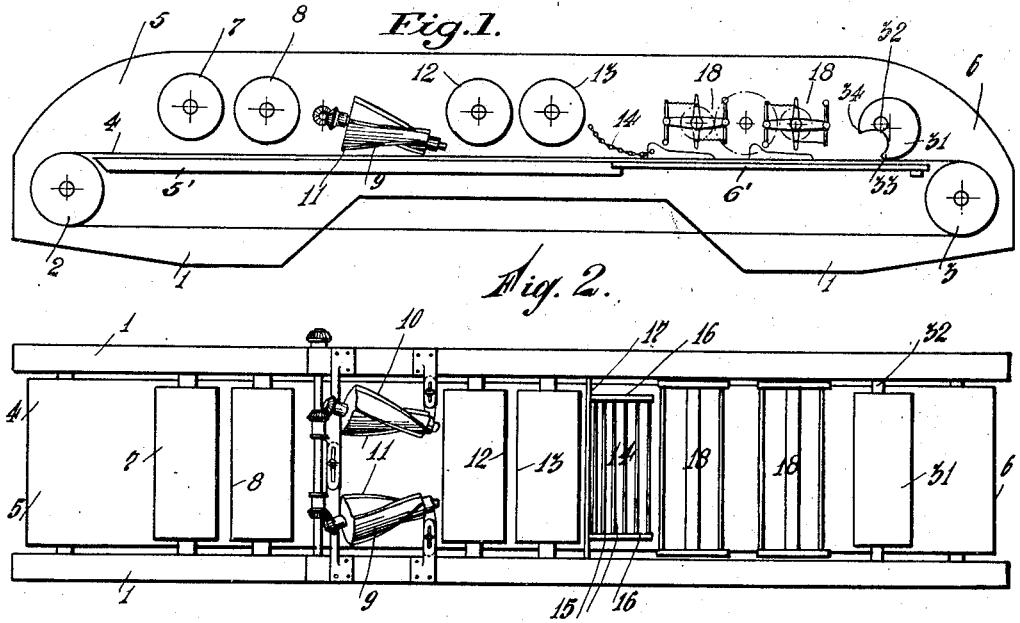
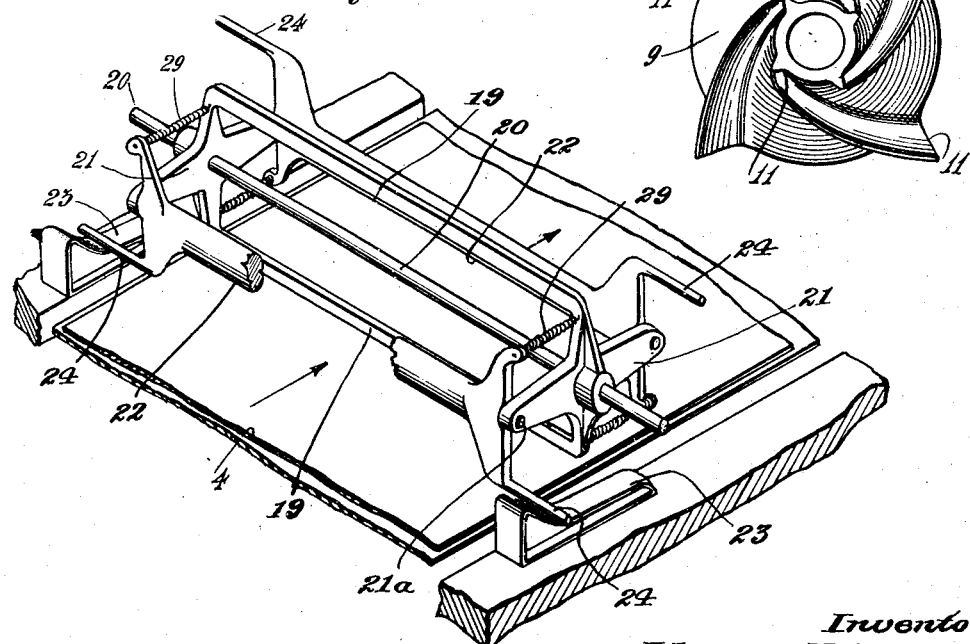
Inventor:
Johannes N. Schroder,
By E. F. Wenderoth
Att'y.

April 11, 1933.      J. NUMAN SCHRÖDER      1,903,572
MACHINE FOR WORKING, MOLDING, AND SHAPING DOUGH
Filed Nov. 10, 1930      3 Sheets-Sheet 2
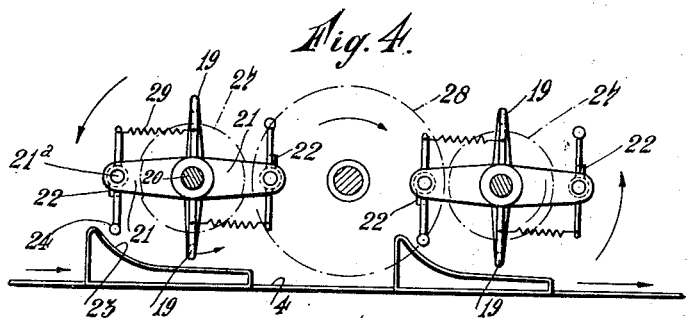
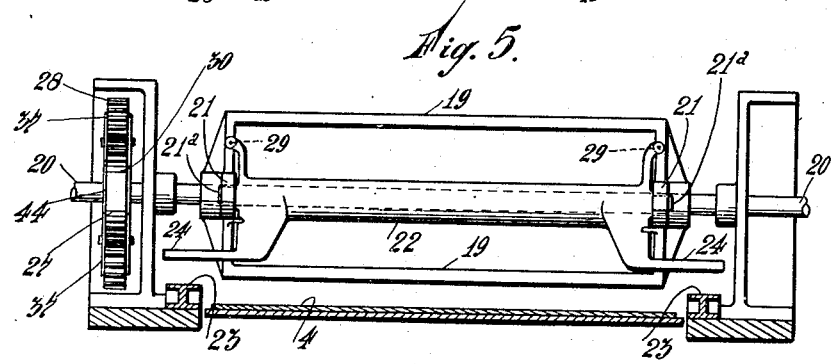
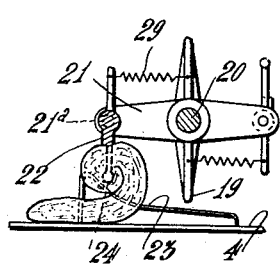
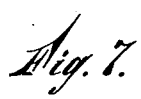
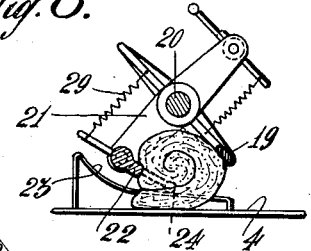
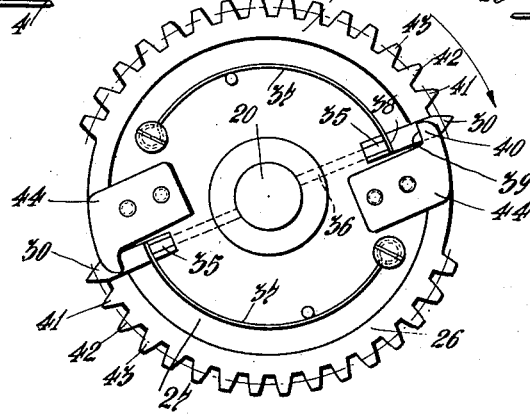
Inventor:
Johannes N. Schroder,
By C. F. Wenderoth
Att'y.

April 11, 1933.  J. NUMAN SCHRÖDER  1,903,572
MACHINE FOR WORKING, MOLDING, AND SHAPING DOUGH
Filed Nov. 10, 1930    3 Sheets-Sheet 3
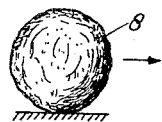
Fig. 9.
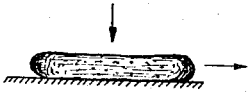
Fig. 10.
Fig. 11.
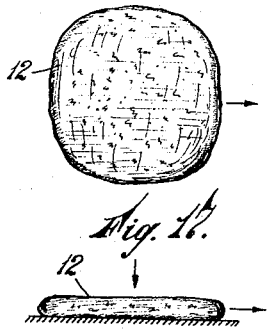
Fig. 12.
Fig. 13.
Fig. 15.
Fig. 17.
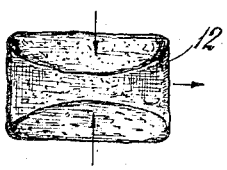
Fig. 14.
Fig. 16.
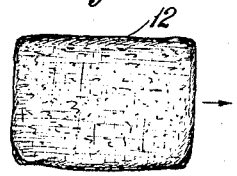
Fig. 18.
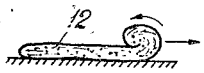
Fig. 19.
Fig. 20.
Fig. 21.
Fig. 22.
Fig. 23.
Inventor
Johannes N. Schroder
By C. F. Wenderoth
Atty

Patented Apr. 11, 1933

1,903,572

UNITED STATES PATENT OFFICE

JOHANNES NUMAN SCHRÖDER, OF LEEUWARDEN, NETHERLANDS

MACHINE FOR WORKING, MOLDING AND SHAPING DOUGH

Application filed November 10, 1930, Serial No. 494,724, and in the Netherlands April 11, 1930.

The invention relates to a machine for working, molding and shaping dough and has for its object to so construct this machine that it is adapted to form of proved dough a scroll of dough which after baking results in a bread that leaves nothing to be desired. Various difficulties are however encountered which are involved with the so-called "folding inwardly", that is to say the folding inwardly and towards each other of the two ends of an oval sheet of dough so as to obtain a rectangularly shaped sheet, further with the curling-over of the front end of the sheet of dough, with the rolling up of the dough into a scroll and with the making of a perfect seam, that is to say a seam that adjoins the scroll of dough smoothly along a straight line.

The said difficulties are overcome by the use of a machine according to the invention which may be considered to consist of various sections or units, each having its own function and thereby each contributing to obtaining a perfect final product, however, when applied conjointly resulting in a machine complying with all possible requirements.

Now the requirements which have to be fulfilled by a machine for working, molding and shaping dough, are that proved dough should not be "killed", that large bubbles should not be present in the formed scroll, that the core of the scroll should be homogeneous, that the scroll should not become unrolled, that the seam should be straight and snugly adjoining the scroll and that the final-product—the bakened bread—should have in side-elevaton a rectangular shape and a straight seam-line.

In the machine according to the invention a conveyer, e. g. an endless belt, is used which runs underneath various doughworking devices.

According to the invention the folding inwardly of both ends of an oval sheet of dough is obtained by means of two folding members, adapted to be rotated positively and transversely to the direction of conveying, the said members being provided with ribs or other projections, that upon rotation of the said members engage the lower side of the ends of the sheet of dough and fold the said ends towards each other.

Each folding member preferably consists of a substantially conical body, which on the conical surface is provided with helical or almost helical ribs that grip under the dough and with the outer circumference are tangent at a conical surface.

Preferably the two conical folding members are mounted in such a manner that the surfaces which are tangent at those sides thereof that are facing each other and are perpendicular to the conveyor, are parallel or almost parallel to each other, while a plane tangent at the lower sides of the two folding members is parallel or almost parallel to the conveyor.

At the rear of the folding device a roller device may be arranged that brings the sheet of dough which by the folding inwardly has been doubled to the right thickness and into almost rectangular shape.

The front end of the sheet of dough lying on the conveyor and shaped into rectangular form in the manner described or otherwise is according to the invention curled over by means of a matshaped folding element suspended at some distance above the conveyor and bearing upon the conveyor.

The arriving sheet of dough rides up the matshaped folding element and thereby obtains the desirable closed curl, which later on gives a homogeneous composition to the core of the bread.

Preferably the matshaped curling over element consists according to the invention of a series of spaced rods, bars or the like which are parallel to each other and to the conveyor and are secured at their ends to a resilient band or the like. A very good result is obtained by forming the matshaped member of a strip of metal gauze having hinged meshes.

The rolling up of the sheet of dough which has been worked by the device described or by other ones is according to the invention effected by means of an abutment that is movable about an axis located above and in parallel to the conveyor and reaches into the path of the sheet of dough, which abutment is connected with a member that may project into the path of the curled over portion of the sheet of dough and presses the scroll during the formation of the latter, upon the sheet, near the place where the flat sheet of dough merges into the curled over portion, when the abutment under the pressure of the arriving sheet is displaced.

Due to the use of this device the scroll is rolled up well adjoining and pressed on so that later on it does not get loose, and further in such a manner that the dough structure is not interfered with, the old well tried hand method being imitated.

The abutment is preferably secured to a shaft carrying at the same time a pressing element located at the rear of the abutment when looked at in the direction of rotation, while in the path of the pressing element a guide member is mounted determining the pressure.

On the shaft of the abutment a disk may be secured which on a portion of its circumference is provided with teeth and which upon rotation of the abutment by the advancing sheet of dough engages a driving gear continuously rotating in the same direction.

The continuously rotating driving gear is preferably mounted between two disks each provided with teeth on a portion of the circumference, the said disks being secured to a shaft provided with the abutment and with a pressing member, so that two successively operating rolling up devices are formed.

The two disks or interrupted gears may be made double-acting, in which case as a matter of course two abutments, each with a corresponding pressing member are mounted upon each shaft.

One or more of the primarily engaging teeth of the interrupted gears which are driven periodically by a continuously rotating driving gear, may be adapted to be pressed in, for instance may be slidable. The first tooth may for instance be adapted to be pressed in and one or more of the adjacent following teeth may be pointed bevelled or the like.

The closing of the seam of an entirely or almost entirely rolled up sheet of dough according to the invention may be effected by means of a concave element pivotally suspended above the conveyor and in its position of rest facing with its concavity the arriving scroll ready to receive the latter.

A very good result is obtained when the receiving end of the concavity is more remote from the axis of rotation than its other end.

The invention will be more fully described with reference to the accompanying drawings illustrating it by way of example.

Figure 1 is a side elevation of the machine shown diagrammatically with the side frame broken away, Figure 2 is a plan view of the machine, Figure 3 is an end view of one of the two folding members, Figure 4 is a side elevation of the rolling up device, Figure 5 is a front elevation of the rolling up device, Figure 5a is a perspective view of the rolling up device with parts broken away for greater clarity, Figure 6 is a side elevation of one of the gears with interrupted teeth, Figure 7 is a side elevation showing the beginning of the rolling up operation by the rolling up device, Figure 8 is a view similar to Figure 7 showing the operation further advanced, Figures 9 to 23 inclusive illustrate the formation of the dough in various stages of the working thereof.

In Figures 1 and 2 the diagrammatically illustrated frame of the machine is denoted by 1. On the said frame two rollers 2, 3 are rotatably supported and serve to support and drive an endless conveying belt 4. Between the two rollers the belt moves upon a supporting board 5' which near the end has been replaced by a resilient metal plate 6'.

At 5 a ball of the dough is placed upon the conveying belt and at 6 the finished scroll of dough leaves the machine. Between these two points the various dough working devices are arranged which will be described more fully hereinafter and in the order in which they work the dough.

The ball of dough passes successively under two flattening rollers 7 and 8 which roll the ball into a sheet of dough as shown particularly in Figures 10 and 11. The maximum dimension of the dough will extend in the direction of the width of the machine, for instance with the average lump of dough when the sheet of dough extrudes from under the roller 8 it has approximately a length of 24 cm. and a width of 17 cm.

When the sheet of dough arrives between the two conical folding members 9 and 10, the ribs 11 thereon which are located upon the conical surface engage the ends of the sheet of dough and fold these ends inwardly as shown in Figure 14. It is obvious that the members 9 and 10 need not have a conical formation, but may be of cylindrical form. When the average sheet of dough has been folded in the sheet will have straight side edges as shown, and the width is reduced from approximately 24 cm. to roughly 13 cm. The sheet of dough is then flattened under the rollers 12 and 13 which causes the sheet to become of practically rectangular shape due to the distribution of the dough produced by the folding inwardly by the members 9 and 10. The form of the sheet of dough is shown in Figure 18.

The sheet of dough upon leaving the roller 13 engages at its front end a curling-over mat 14 which is constructed of a series of metal members or bars 15 which are interconnected at both ends by a belt 16 of resilient material such as for instance linen, and the mat is suspended at 17 as shown in Figure 2 at such a height above the belt 4 that the free end of the mat will slide upon the belt 4. The sheet of dough is engaged by the mat and curled over as shown particularly in Figures 19 and 20 and the mat will prevent the dough from assuming its original position upon the belt 14. It is obvious that the mat may be constructed in various ways so as to secure this preliminary curling-over. For instance the mat may be made of metal gauze with the meshes thereof hinged.

After the sheet has thus been preliminarily curled it will pass successively through one or more rolling up devices 18 shown particularly in Figures 4, 5, 5a, 7 and 8.

Upon the shaft 20 of the rolling up device 18 an abutment 19 is fixed and arms 21 extend integrally at right angles to the abutment 19. Upon the ends of the arms 21 are pivotally secured the pressure members 22 which are rotatable due to the pivots 21a of the pressure arms 22 being rotatably mounted in the arms 21. Extending from the pressure members 22 are lugs 24 which are adapted to cooperate with the guides 23 provided upon the frame of the machine. The pressure members 22 presses the scroll near the place where the flat sheet of dough emerges into the curled over portion against the not yet rolled up portion of the sheet while at the same time tensioning the doughskin about the curled over portion so that any working back of the dough is prevented and a snug rolling up is ensured similar to the same effect as obtained by hand operation.

The shaft 20 carries at one end a disk 27 provided with interrupted teeth 25 and 26 which are designed to engage the continuously rotating gear wheel 28 whereby the shaft 20 may be positively rotated to an extent determined by the two segments 25 or 26. Springs 29 extend from other lugs provided upon the pressure member 22 to the abutment member 29 and serve to bring the pressure member 22 into their normal position which is shown in Figure 4. The springs 29 also serve to return the pressure member 22 when it has been displaced by the dough.

The construction of the gear wheel 27 is shown particularly in Figure 6. It will be noted that the tooth 30 beginning each row of teeth is pointed. Furthermore, this tooth is readily slidable along the body of the gear wheel. The teeth 30 are provided with pins 35 slidable in the radial channels 36. A spring 37 is provided which presses against a shoulder 38 upon the tooth by which the tooth is maintained in its normal position with the shoulder 39 engaging against a nose 40 of an abutment 44. The teeth 41, 42 and 43 which follow the slidable tooth 30 are decreasingly pointed or bevelled.

As the sheet of dough approaches the rolling up device 18 it is already partially rolled by the mat 14 and the partially rolled portion will come into contact with the pressure member 22 as shown in Figure 7. The pressure member 22 will hold the dough back upon the top of the curled-over portion while the conveyor 4 will continue to carry the sheet of dough along below the curled over portion. As the conveyor 4 carries the dough along underneath, the dough will strike the abutment 19 and will cause this abutment to start the rotation of the shaft 20 and the wheel 27 carried by the shaft will have a row of teeth connected with the constantly rotating gear wheel 28. As the disk 27 is rotated the pressing member and abutment will assume the position shown in Figure 8, thereby completing the rolling of the dough and the rolling up member 18 will make a 180° rotation until the interrupted portion of the teeth come again opposite the rotating gear 28. During the rotation of the abutment member 19 and the pressure member 22, the lugs 24 will come in contact with the guide members 23 and thereby rotate the pressure member 22 so as to prevent the pressure member 22 from having an undesired effect upon the dough which would happen if the pressure member 22 were maintained fixed since in such case there would be a rubbing action between the pressure member 22 and the surface of the curled up dough. The device is essentially very quick in operation. The taking up by the mat of the entering edge of the sheet of dough, the initial rolling and the continued rolling and releasing of the dough by the rolling up device takes only a few seconds. It is proven in practice that as a general rule two rolling up devices 18 are not required and that good results can be accomplished with only one rolling up device. However, it is obvious that any number of such rolling up devices may be used.

It is also obvious that the measurements of the different parts of the rolling up device 18 as well as the speed of rotation and the distance above the conveyor 4 are dependent upon the thickness of the sheet of dough, the degree of rolling desired, the elasticity of the dough, and various other factors. For this reason deviations from the constructions shown may be essential, but the operation of the device remains essentially as above set forth.

If the original sheet of dough is thinner than usual or the curl desired is smaller, then the pressure member should be placed nearer to the conveyor 4 and can also be made wider. It is also obvious that the distance between the pressure member 22 and the abutment 19 is largely dependent upon the particular nature of the dough being treated. The same is also true of the speed at which the conveyor 4 is driven and the diameters and the speed of the gear wheels 27 and 28. The composition and the nature of the dough will be different in different bakeries and in such cases the various measurements of the different elements must be coordinated to the type of dough used and as shown in practice as being the most suitable.

As stated above, the dough is partly curled over by the mat 14 and the remainder of the curl is imparted by the devices 18.

At the point where the member 19 exerts its pressure against the dough the support underneath the conveying belt 4 is made resilient or elastic so as to ensure correct operation without damaging the roll of dough. The teeth 30 of the gear 27 are also preferably made resilient so that these teeth upon engaging the main gear 28 will not be injured and furthermore a noiseless engagement is secured.

Towards the end of the belt 4 a concave member 31 is rotatably mounted upon a shaft 32. This member is balanced normally so that it keeps the position shown in Figure 1 in which the point 33 which is positioned further from the shaft 32 than the point 34, extends downwardly into the path of the sheet of dough which is now practically entirely rolled up. The member 31 firmly presses the rolled up dough together and seals the seam. After this operation the belt 4 will convey the shaped and finished scroll of dough to the delivery place 6. As a general rule with the ball of dough indicated previously as being about the average, the diameter of the finished scroll is about 6 cm. while the length according to whether a scroll of four ounces or of eight ounces is made, amounts to 18—35 or 30—35 cm. respectively.

By the construction above described it has been possible to obtain a product eliminating the disadvantages of the products made by known machines and possessing several very good properties which are also present in hand-shaped breads.

It is also obvious that the folding members 9 and 10 may be adjusted by any other desired means towards or away from one another than that shown in Figure 2. Also the shape and the number of the abutments 19 may be varied as well as the number and shape of the pressure members 22 which are both mounted upon the single shaft 20. In the same way also the bars 15 of the mat 14 may be increased or decreased in number. It is also obvious that a plurality of members 31 may be used.

The construction set forth above is the preferred construction, but this construction is merely illustrative and is not to be construed in a limiting sense.

I claim:

1. A device for a machine for working, molding and shaping dough, for folding inwardly the two ends of a sheet of dough which is advanced on a conveyor comprising two folding members adapted to be rotated positively and transversely to the direction of conveying in which each of the folding members comprises a substantially conical member which on its conical surface is provided with substantially helical ribs projecting under the dough and being tangent at the outer circumference of a conical surface.

2. Device according to claim 1, in which at the rear of the folding members a roller device is mounted which brings the doubled sheet of dough back to the right thickness and into substantially rectangular shape.

3. A device for closing the seam of an entirely or almost entirely rolled up sheet of dough in a machine for working, molding and shaping dough in which the scroll of dough is advanced by a conveyor, comprising a concave member rotatably suspended above the conveyor, which member in the position of rest faces with its concavity the arriving scroll of dough ready to receive the latter.

4. A device according to claim 3, in which the receiving end of the concavity is more remote from the axis of rotation than the other end.

5. A device for folding inwardly the two sides of a sheet of dough advanced on a conveyor in a machine for working and molding dough, comprising two rotary folding members having their sides adjacent the conveyor substantially parallel to the direction of conveying of the sheet of dough, said folding members having ribs or other projections, which upon rotation of the said members project under the ends of the sheet of dough and fold said sides inwardly towards each other.

6. A device according to claim 5, in which the ribs or projections have a helical shape.

7. A device according to claim 5 in which the ribs are lying with their outer edges on a conical surface and in which the bases of the cones face the side from which the sheet of dough arrives.

8. A device for rolling up a sheet of dough preferably curled over at the front end for use in machines for working and molding dough, comprising a conveyor, a shaft located at some distance above said conveyor, an abutment adapted to be moved in the direction in which the conveyor moves about said shaft, the said abutment projecting into the path of the sheet of dough and being connected to a pressure member that presses on the scroll when being formed on the sheet of dough near the place, where the sheet has its scroll, when the abutment is moved under the influence of the pressure of the arriving sheet of dough.

9. A device according to claim 8, in which a guide member regulating the pressure on the dough is mounted in the path of the pressure member.

10. A device according to claim 8, in which on the shaft of the abutment and the pressure member a gear wheel is attached, which at a portion of its circumference is provided with teeth and upon a rotary movement of the abutment by the advancing sheet of dough engages a driving gear continuously rotating in one and the same direction, the engagements being maintained until the same or the following abutment with its pressure member has again arrived in the initial position determined by the end of the toothed part of the first mentioned gear wheel.

11. A device according to claim 8, in which a driving gear wheel is mounted on the shaft of said abutment and said pressure member, said driving gear wheel being mounted between two gear wheels each provided with teeth at a portion only of their circumference and a shaft provided with an abutment and a pressure member for each of said two gear wheels, and thereby forming two successively operating single or multiple rolling up devices.

12. A device for folding inwardly both sides of a sheet of dough being advanced upon a conveyor comprising two rotary folding members, said members being arranged in parallel relation above said conveyor, means for rotating said folding members positively and transversely to the direction in which the dough is being conveyed, said folding members having ribs for gripping the sides of the sheet of dough and folding said sides towards the center of the sheet of dough.

13. A device according to claim 12 in which said folding members have a conical shape and the ribs provided upon said members have a substantially helical formation and said folding members having their greatest diameter directed towards the entering edge of the sheet of dough.

14. A device according to claim 12 in which the rotary folding members have a conical shape and said folding members are disposed so that the sides facing each other are arranged in substantially parallel relation and the sides disposed opposite the conveyor are arranged in substantially parallel relation to said conveyor.

15. A device for rolling up a sheet of dough comprising a conveyor, a rotatable shaft positioned transversely above and parallel to said conveyor, a preliminary curling device for the leading edge of the dough, an abutment upon said shaft projecting into the path of the sheet of dough, a pressure member carried by said shaft adapted to perform a gripping and downward pressing action upon the scroll of dough and means for imparting to said abutment and said pressing member a partial revolution so as to complete the curl of said dough.

16. A device for rolling up a sheet of dough comprising a conveyor for the sheet of dough, a rotatable shaft located above said conveyor, an abutment upon said shaft, a pressure member carried by said shaft, said pressure member being hingedly connected to said shaft, means for imparting to said abutment and said pressure member a partial revolution and means for oscillating said pressure member to control the pressure upon said dough.

17. A device for rolling up a sheet of dough comprising a conveyor, a rotatable shaft positioned above said conveyor, an abutment member secured to said shaft, arms secured to said shaft, a pressure member rotatable in said arms, a gear wheel having interrupted teeth upon said shaft, a continuously rotating gear wheel with which said gear wheel having interrupted teeth is adapted to engage and said segments of interrupted teeth upon said gear wheel being of sufficient extent so as to completely curl a sheet of dough before said gear wheel having the interrupted teeth is released from the continuously rotating gear wheel.

18. A device for rolling up a sheet of dough comprising a conveyor, a plurality of intermittently operated dough curling devices positioned above said conveyor, a gear wheel having interrupted teeth carried by each of said dough curling devices and a continuously rotating gear wheel positioned between each pair of dough curling devices for intermittently operating said dough curling devices.

In testimony whereof I affix my signature.

JOHANNES NUMAN SCHRÖDER.